Dec. 4, 1962  A. AMBLI  3,066,974
TOP SUPPORTING BOW MEMBER FOR TRAILERS AND THE LIKE
Filed March 7, 1960
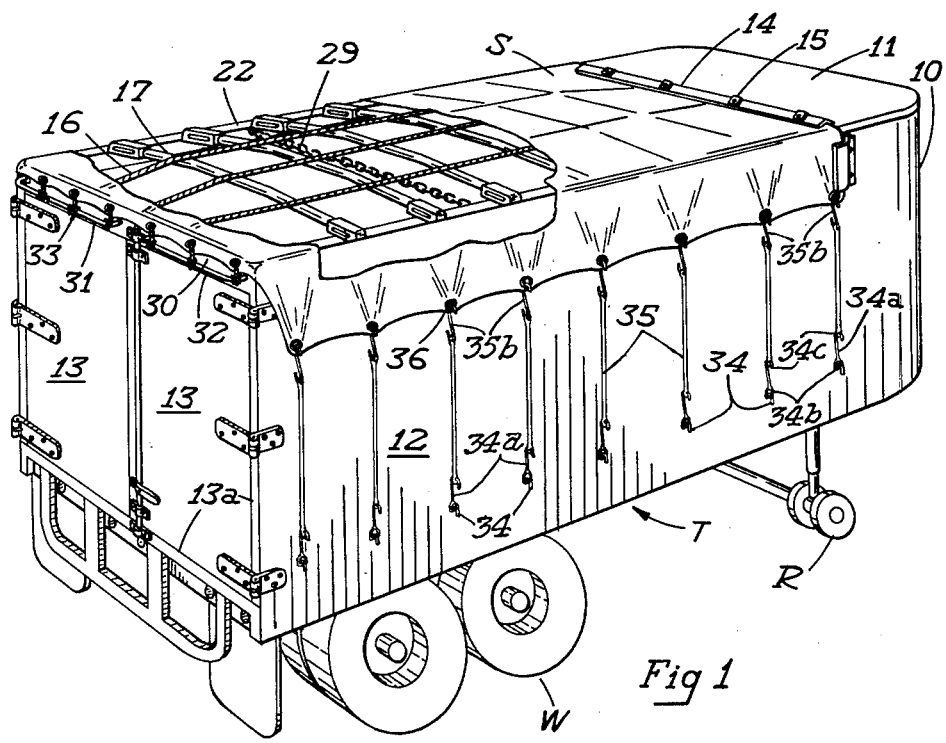
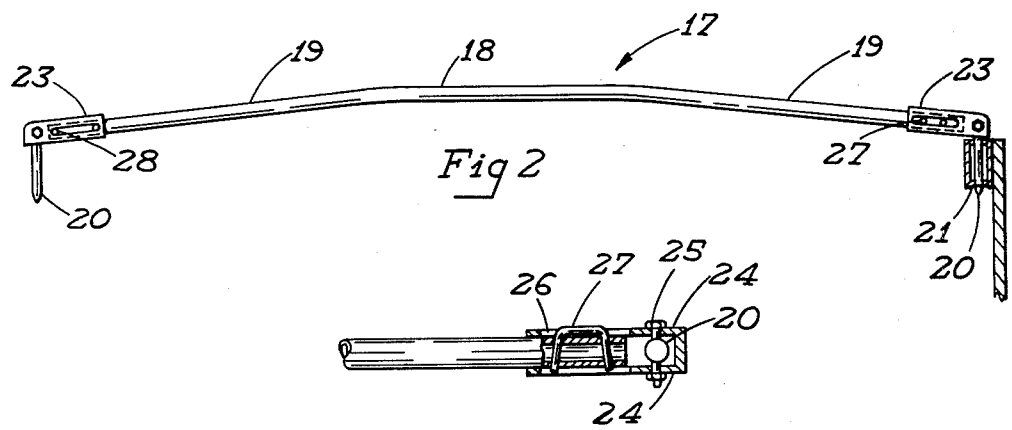
INVENTOR.
ANDREW AMBLI
BY Williamson,
Schroeder, & Palmatier
ATTORNEYS

United States Patent Office 3,066,974
Patented Dec. 4, 1962

3,066,974
TOP SUPPORTING BOW MEMBER FOR TRAILERS AND THE LIKE
Andrew Ambli, 2376 N. Hamline Ave., St. Paul, Minn.
Filed Mar. 7, 1960, Ser. No. 13,069
3 Claims. (Cl. 296—100)

This invention is a continuation-in-part of my co-opending application Ser. No. 720,602, now Patent No. 2,969,284, and relates to a readily installed or removable flexible top covering for trailers and the like with improved means for supporting and tensioning the tarpaulin or other material from which the top proper is constructed.

An object of this invention is to provide a novel and improved converter top for use with trailers and the like including a plurality of upwardly arched bow members extending between and detachably connected to the side walls of the trailer by shiftable connector elements for supporting and doming the tension tarpaulin and being arranged and constructed for limited axial extension and traction whereby to provide for slight lateral shifting of the trailer side walls.

Another object of this invention is to provide a novel and improved bow member for use with trailers and the like and adapted to support and partially tension a flexible cover thereupon, said bow members adapted to extend between and be detachably connected to the sides of the trailer side walls and being arranged and constructed for slight extension and contraction to compensate for spreading apart and contraction of the walls of the trailer during transit and during loading.

A more specific object of this invention is to provide a novel and improved converter top for use in conjunction with trailers and the like and including tension tarpaulin supported and partially tensioned by a plurality of upwardly-arched, bow members extending between the sides of the trailer and having parts thereof arranged for limited relative shifting movement to compensate for spreading apart or slight contraction of the trailer side walls, said bow members also adapted to flex slightly when said shiftable parts are restricted as to further movement in a given direction to thereby preclude damage to the trailer converter top.

These and other objects and advantages of this invention will more fully appear from the following description, made in connection with the accompanying drawings, wherein like reference characters refer to the same or similar parts throughout the several views, and in which:

FIG. 1 is a rear and side perspective view showing a form of my converter top prior to a conventional open top trailer with parts thereof broken away for clarity;

FIG. 2 is a side elevational view of the novel supporting and tensioning bow members; and FIG. 3 is an enlarged transverse section taken generally on line 3—3 of FIG. 2 and looking in the direction of the arrows.

One embodiment of my novel and improved "converter top" is shown applied to a conventional type of semi-trailer, indicated in its entirety by the letter T, having upstanding, convexly curved forward end 10 provided at its top with the cowl 11 which has a sealed relation with the part 10. The trailer T is also provided with elongated side walls 12 which extend continuously from the front 10 and are connected and supported in a suitable and conventional manner from the bottom of the trailer body. The body or chassis being supported at its rear end in a conventional maner and cushioned by two sets of axially aligned dual wheels, is provided, as shown, with conventional pneumatic tires.

The front central portion of the trailer at its bottom is provided with an adapter swivelly supported on the fifth wheel of a tractor or the tractor vehicle (not shown) and when the trailer is unhitched, it is supported in a conventional manner upon a trailer retractable roller gear, indicated as an entirety by the letter R.

The rear of the trailer is provided with a pair of vertically hinged doors 13 each having out-turned sealing flanges 13a around the portions of the configuration thereof and adapted to be closed to form a substantially continuous rear wall for the trailer chassis.

My novel converter top also includes a sheet or tarpaulin-clamping-retainer at the rear edge of the cowl 11 indicated by its entirety by the letter C. This tarpaulin-clamping structure is constructed in the manner of the tarpaulin-clamping structure of my co-pending application Ser. No. 720,602 and only the obtusely angled ridge member 14 and the similarly angled clamping plates 15 are shown. The remaining details of this tarpaulin-clamping-retaining structure are substantially identical to that shown in my co-pending application and the various details thereof are deemed unnecessary for the purpose of the instant invention. It is of importance to note that through the use of my tarpaulin-clamping-retainer, the tarpaulin may be readily and neatly used even though the tarpaulin is somewhat larger than the trailer. The tarpaulin will be fastened at the rear of the trailer and any surplus amount of tarpaulin at the front end thereof may be doubled thereunder and retained in the clamp, thus a neat apearing tarpaulin is always presented.

A plurality of longitudinally extending tarpaulin-supporting and tensioning cables are also provided having their forward ends attachably connected with the rear edge of the cowl 11. It will be noticed that I have provided three of such cables 16 with the central longitudinal cable being disposed generally at a higher level than the two side cables and with the side cables being disposed and maintained at a higher level than the longitudinal upper edges of the trailer walls 12 whereby a doming effect is obtained in the contour of the tension flexible tarpaulin S. These cables 16 although not shown in the drawings, are looped and resiliently secured at their forward ends by spring members in the manner of my co-pending application Ser. No. 720,602.

Cooperating with the flexible, spaced longitudinally extending tensioning cables 16 are a plurality of transversely extending, readily removable bow members. These bow members are designated in their entireties by the number 17 and are formed of a strong metallic tubular member but have a moderate degree of flexibility and resiliency and are upwardly arched, in the preferred form. These upwardly-arched bow members are each comprised of a substantially straight, intermediate arched portion 18 and side portions 19 which decline from the central straight portion 18. Referring now to FIG. 1, it will be noted that the central portion 18 supports the center or central cable 16 while the side portions 19 of the bow members each support one of the side cables 16 thereon. Each of the bow members 17 carries at the two ends thereof, depending stud members 20 tapered at their outer extremities for ready insertion and securing into depending open-sockets 21 provided at regular spaced intervals in the rub rails or top rails 22 of the side walls 12 of the trailer.

The ends of bow members 17 are connected with the respective upper ends of the stud members 20 by mounting members 23 each having an inverted channel shaped configuration. The outer ends of these mounting members 23, on their vertical webs 24, have axially aligned openings for accommodating pivot bolts 25 to pass through suitable diametric bores in the upper ends of studs 20. These channel shaped mounting members 23 also have horizontally aligned longitudinal slots 26 formed in the vertical web 24 thereof and the terminal portions of the bow members 17 have diametric bores therethrough, aligned with the respective slots of each of the channel shaped mounting members 23 for accommodation of coupling members which in the preferred form of my structure, comprise heavy U-shaped wires or rods 27 and 28 respectively as best seen in FIGS. 2 and 3. It will be noted that reference numeral 27 is used to designate the U-shaped wire or rod at the right end of the bow member 17 as viewed in FIG. 2 while the reference numeral has been used to designate the U-shaped wire at the left end of the bow member 17. It will be noted that the U-shaped wire 27 has its respective legs spaced apart a substantial distance less than the longitudinal extent of the slots 26 while the legs of the U-shaped rod 28 are spaced a wide distance to substantially fill the lengths of the associated slots 26. Thus it will be noted that at least one of the slot and pin connections through channel shaped mounting members 23 is arranged for relative limited sliding movement of the mounting member and its associated bow member. This is necessary to compensate for lateral spreading or contraction of the side walls 12 of the trailer during certain loaded or unloaded conditions.

The trailer T is also provided with anti-spreader chains 29 which as seen in FIG. 1, extend between the sides 12 thereof. These anti-spreader chains 29 are of similar construction as the anti-spreader chains in my co-pending application Ser. No. 720,602, but do not have means for adjustment of the same. The chains 29 are of substantially the same width as the distance between the trailer walls 12. With this arrangement, there is no danger of the chains being tightened up too much when these chains are locked in place. These anti-spreader chains 29 engage the side walls 12 of the trailer and are tensioned to cooperate with the laterally adjustable bow members 17. My novel converter top also includes a rear split-header construction 30 for securing and tensioning the rear of the tarpaulin S to the trailer. The details of this split-header construction are not shown but are substantially similar to the header construction as illustrated in my co-pending application. This header construction is provided with a pair of transverse rigid tie rods 31 and 32 as shown in FIG. 1 and the rear end of tarpaulin S is provided with short tie ropes 33 which may be secured to the tie rods 31 and 32 for promptly tensioning the tarpaulin S. The side walls 12 are each provided with a plurality of longitudinally aligned hooks 34 spaced throughout their respective lengths. Referring now to FIG. 1, it will be seen that a plurality of elongated hook-engaging members 34a are cooperatively associated with the hooks 34. Each of these elongate hook engaging members 34a defines an eye 34b at the lower end thereof which is disposed in engaging relation with one of the hooks 34. A plurality of flexible vertically disposed connecting elements such as rubber straps 35 are secured at their upper ends to grommets 36 of the tarpaulin by means of hooks 35a. The lower ends of each of the straps is interconnected with the hook portion 34c of each hook engaging member 34a and these resilient straps 35 place the requisite tension on the respective side edges of the tarpaulin for retaining the same in place.

It will be noted that bow members 17 are formed preferably of tubular material and are of singular continuous construction. The channel shaped members 23 and the pin and slot construction permit relative sliding movement of the channel shaped member with respect to its associated bow member and thus slight lateral contraction and expansion or spreading of the side walls may be compensated for. However, when one of the legs of U-shaped rods 27 is engaging the edge of the mounting member defining the slot, and further relative sliding movement between the channel-shaped mounting member 23 and its associated bow member 17 is restricted, the bow member 17 because of its single continuous construction is adapted to flex slightly. If, for example during the loading operation, the side walls 12 are spread apart so that further sliding movement between mounting member 23 and bow member 17 is restricted, then the bow members may flatten somewhat or flex downwardly in a vertical plane if additional outward force is exerted on the walls. This would prevent the bow members from being ripped from their sockets or otherwise damage to the trailer. It will also be noted that in the event the side walls are forced together beyond the limits permitted by the pin and slot connection of the bow member and mounting members, the bow members may then flex or arch upwardly somewhat because of their semi-rigid construction.

Trailers of the type shown are generally loaded from above by cranes and the like and this type loading requires removal of the cover tarpaulin S and the bow members 17. The single continuous construction of the bow members along with the unique coupling connection permits ready removal of these bow members thus facilitating loading of the trailer. The single upwardly arched construction increases the loading space within the trailer.

From the foregoing description, it will therefore be seen that I have provided a flexible top covering which includes supporting and tensioning bow members arranged and constructed to be contracted and axially extended to compensate for spreading and forcing together the side walls of the trailer. It will also be noted that the bow members of my converter are also arranged and constructed to flex slightly in a vertical plane which serves as a safety factor and precludes damage to the trailer and converter top if excess loads are exerted against the side walls of the trailer. It will also be noted that the bow members of my novel converter top are of simple and inexpensive construction and are easily removed and attached to the side walls of the trailer. Thus it will be seen that my novel converter top is of substantially light weight but is substantially strong and durable.

It will, of course, be understood that various changes may be made in the form, details, arrangement and proportions of the parts without departing from the scope of this invention and which consists of the matter shown and described herein and set forth in the appended claims.

What is claimed is:

1. Bow construction for use with normally open top trailers comprising, an elongate arched bow member adapted to extend between and interconnect opposite side walls of a trailer for underlying, supporting and doming a flexible cover removably attached to the trailer, said bow member having detachable coupling connections at its respective ends for removable interconnection with the side walls of the trailer, the coupling connection at at least one of said ends including a mounting member mounted on said one end of said bow member, one of said members having a pin projecting laterally therefrom and the other of said members having an elongate substantially straight slot therein and extending longitudinally of said bow member and receiving said pin therethrough to permit free sliding movement between said members laterally and transversely of the trailer when said bow member is so interconnected to the side walls of the trailer, and a depending element pivotally connected to said mounting member for detachable connection to the upper side wall portion of the trailer.

2. The structure as defined in claim 1 wherein said mounting member is of channel-shaped cross sectional configuration, and said one end of said bow member positioned within said mounting member.

3. Bow construction for use with open-top trailer vehicles comprising an upwardly-arched single, continuous bow member formed of metallic material having a moderate degree of resiliency and flexibility, said bow member adapted to extend between the side walls of the trailer vehicle for underlying, supporting and doming a removable flexible cover sheet therefrom, said member having coupling connections at its ends including depending attachment elements for removable connection with cooperating attachment elements formed in the respective upper edge portions of the trailer side walls, the coupling connection at at least one end of said bow member comprising a mounted member mounted on said bow member one of said members having a pin extending laterally therefrom and the other of said members having an elongate substantially straight slot formed therein and extending longitudinally of said member and receiving said pin therethrough to permit relative limited sliding movement between said members said mounting member being pivotally connected to the upper end of its associated depending attachment element, and said bow member being adapted to flex slightly in a vertical plane when further relative sliding movement between said mounting member and the associated end of the bow member is restricted in a given direction.

References Cited in the file of this patent

UNITED STATES PATENTS

| | | |
|---|---|---|
| 1,679,642 | Walden | Aug. 7, 1928 |
| 2,450,589 | Falk | Oct. 5, 1948 |
| 2,679,432 | Ruth | May 25, 1954 |
| 2,741,507 | Ambli | Apr. 10, 1956 |
| 2,774,623 | Owen | Dec. 18, 1956 |

FOREIGN PATENTS

| | | |
|---|---|---|
| 84,105 | Germany | Nov. 16, 1892 |